United States Patent Office 3,395,280
Patented July 30, 1968

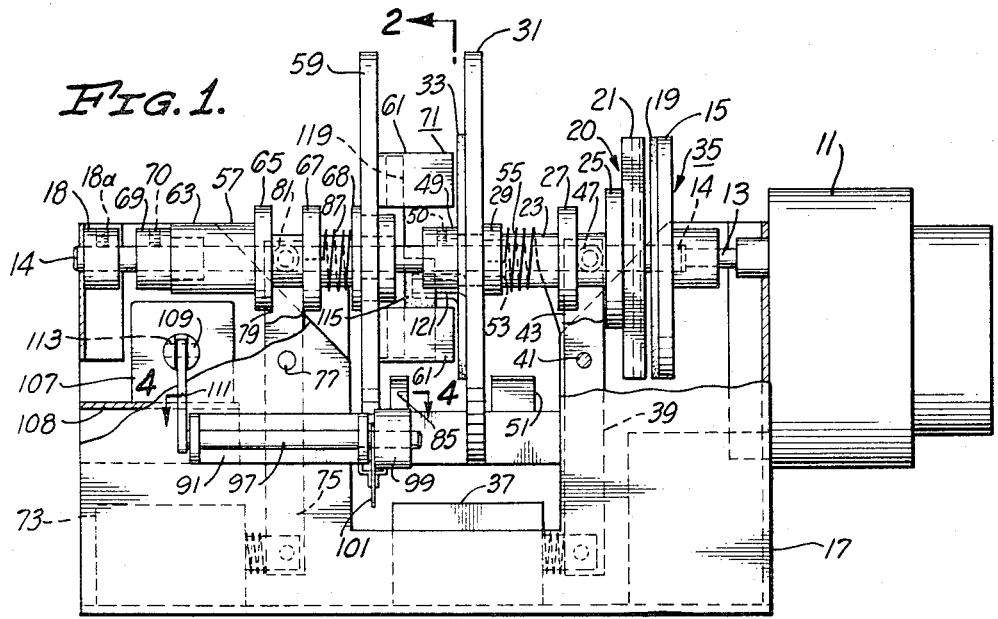
Fig. 1.
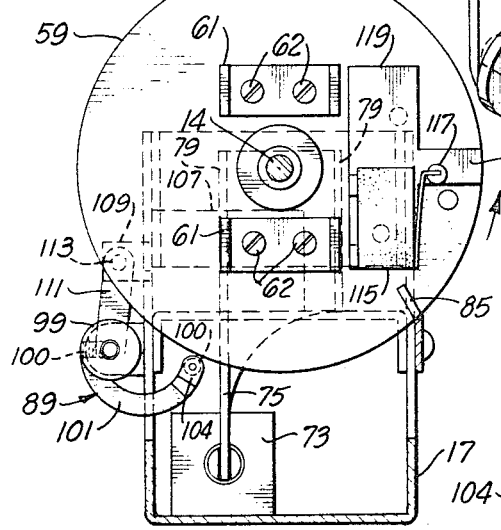
Fig. 2.
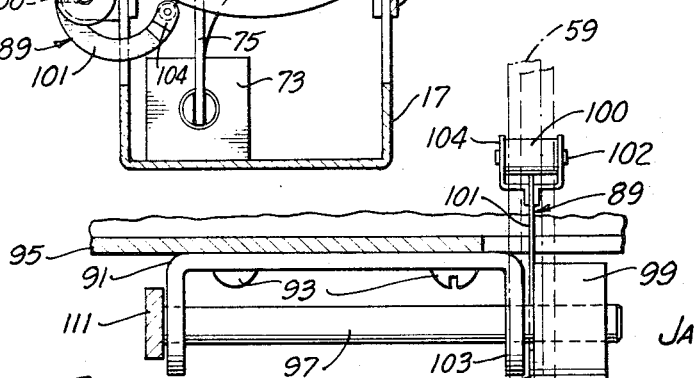
Fig. 3.
Fig. 4.
INVENTOR.
JACOB EDWIN DIETRICH
BY HIS ATTORNEYS
HARRIS, KIECH, RUSSELL & KERN

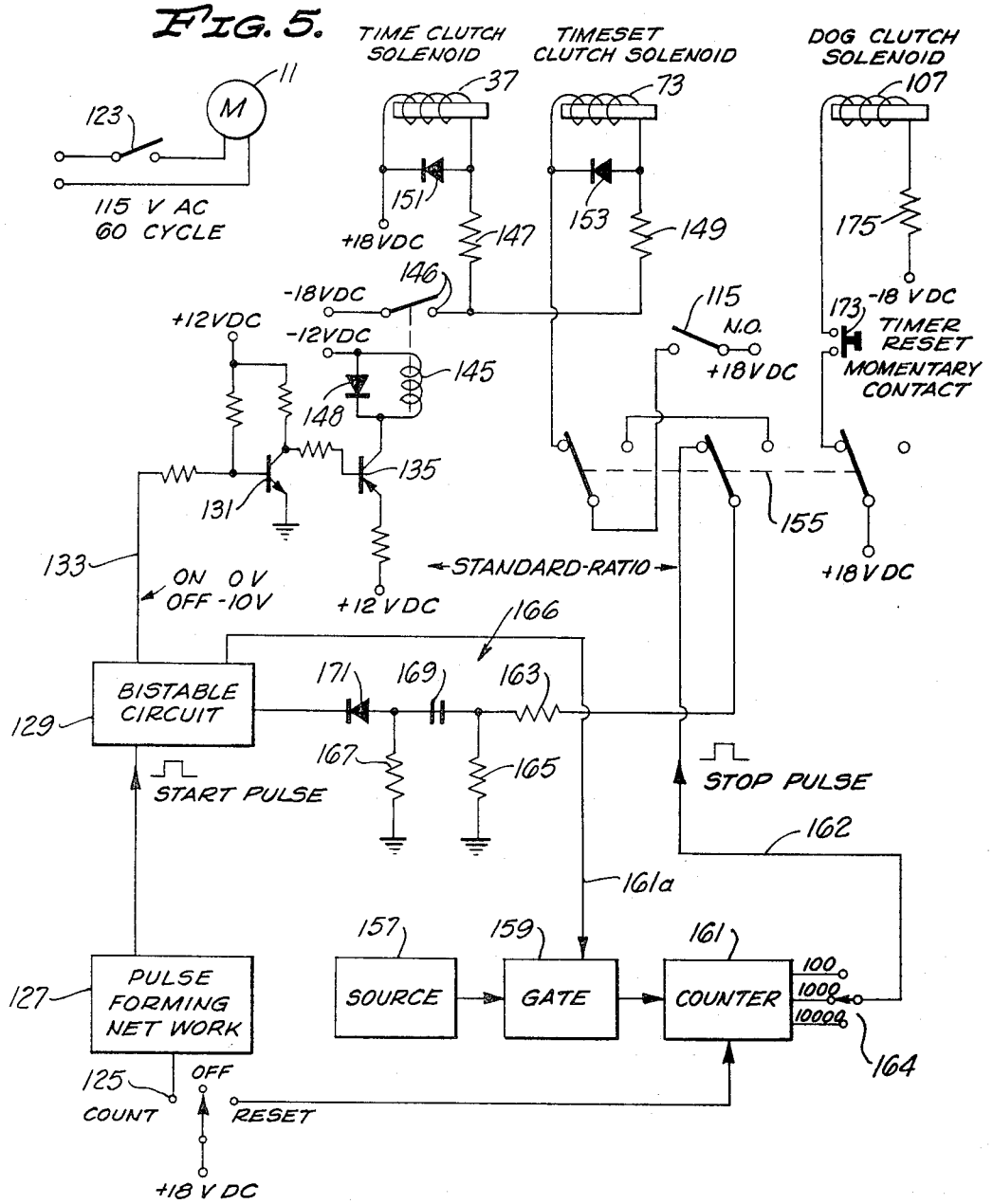

3,395,280
AUTOMATIC INTERVAL SETTING MEANS IN TIMING DEVICE FOR COUNTING NUCLEAR DISINTEGRATIONS
Jacob Edwin Dietrich, Tarzana, Calif., assignor to Ambco Electronics, Los Angeles, Calif., a corporation of California
Filed Oct. 23, 1964, Ser. No. 405,988
12 Claims. (Cl. 250—106)

ABSTRACT OF THE DISCLOSURE

A timer with automatic setting of the time interval, including means for counting a predetermined number of events, means for automatically setting the time interval of the timer to the time which was required to count such predetermined number of events, and means for counting the number of events occurring in said set interval during subsequent counting cycles, thereby providing for comparison of unknown samples with the known sample used in initially setting the time interval. A counter which automatically counts the pulses from a second sample for the same period of time that it counted a predetermined number of pulses from a first sample.

---

This invention relates to a timer with automatic interval setting and, more particularly, to a device which automatically measures and retains the time required to perform a given function. The device will then control subsequent operations so that they can be run for the length of time previously measured and retained by the device. This device is useful when a variable function or a series of variable functions is to be measured with respect to a standard function and particularly where the standard function is changed periodically and the new standard function assumes a different measured time.

Such a timer with automatic interval setting is particularly useful in counting applications, such as the counting of nuclear disintegrations; for example, those occurring in a sample containing radioisotopes. In laboratory work, it is frequently desirable to compare a standard or known sample of radioactive material with an unknown sample of radioactive material. To do this, a predetermined number of nuclear disintegrations, which occur at irregular intervals, must be counted in a known sample, and the period of time during which these disintegrations occurred must be accurately measured. Next, the number of nuclear disintegrations occurring in an unknown sample are counted for a period of time. With this data and by using the following formula, the technicians can compare the unknown sample with the known sample:

$$S = \frac{N_x/T_x}{N_s/T_s}$$

where $N_x$ is the total number of counts accumulated from the unknown sample; $T_x$ is the total time required to accumulate the counts from the unknown sample; $N_s$ is the total number of counts accumulated from the standard; $T_s$ is the total time required to accumulate the counts from the standard; and S is the ratio of radioactivity of the unknown sample with respect to the standard. If both counts are taken for equal intervals of time, $T_x$ equals $T_s$, and the ratio is equal to the number of counts from the unknown sample divided by the number of counts from the standard.

Accordingly, it is an object of this invention to provide a timer with automatic interval setting which will automatically measure and retain a time period required to perform a given function and will then allow subsequent functions to be performed for the same period of time.

Still another object of this invention is to provide a device which will compare an unknown sample with a standard.

Another object of this invention is to provide a timer with automatic interval setting operable with nuclear counting equipment for automatically comparing an unknown sample of radioactive material to a standard sample of radioactive material.

A further object of this invention is to provide a device which is easy to operate and which will provide and calculate automatically the value of S as used in the above formula.

The objects of this invention may be realized by providing a device having a first member which moves from an initial to a final position while a predetermined number of events are being counted. After reaching the final position, the first member returns immediately to the initial position; however, the final position is marked by a second movable member which was adjusted by the movement of the first member to the final position. Subsequently, the first member may be moved along the same path from the initial to the final position and during this time an unknown number of events may be counted. When the first member reaches the final position, as established by the second movable member, the count is automatically discontinued. It is apparent, therefore, that the first movement of the first member serves to measure a period of time and the second movable member retains that period of time by marking the final position of the first member. Subsequent movement of the first member from the initial to the previously determined final position serves to operate a counter for the period of time that the member is moving.

The invention, both as to its organization and method of operation, together with further objects and advantages thereof, may best be understood by reference to the following description taken in connection with the accompanying drawings. The drawings merely show and the description merely describes preferred embodiments of the present invention which are given by way of illustration or example. The invention also comprises novel details of construction and novel combinations and arrangements of parts, which will more fully appear in the course of the following description.

In the drawings:

FIG. 1 is a side elevation partly in section showing a preferred embodiment of the device of the present invention;

FIG. 2 is a sectional view taken along line 2—2 of FIG. 1;

FIG. 3 is a perspective view of the dog clutch employed in the present invention;

FIG. 4 is an enlarged view partially in section taken along line 4—4 of FIG. 1 showing the dog clutch; and FIG. 5 is a wiring diagram for the controls of the present invention.

With reference to FIG. 1, a motor 11 driving a shaft 13 carrying a metal disc 15 is mounted on a housing or supporting structure 17. The motor 11 is a constant speed motor preferably having a very slow output shaft speed of the order of three revolutions per hour which in the embodiment illustrated provides a timing range of seven seconds to eighteen minutes. Higher or lower speeds may be used for other timing ranges. Of course, various gear reduction mechanisms may be employed to obtain the desired shaft speed.

The shaft 13 is turned continually at constant speed by the motor 11 when the device is turned on at switch 123 and extends entirely through the housing 17 and is supported thereby. A shaft 14 is journaled within the disc 15 and the housing 17 coaxial with the shaft 13 and is limited in its axial movement by a collar 18, which is suitably secured by a screw 18a to the shaft at the end thereof opposite the motor 11. The disc 15 has a clutch facing 19 of neoprene rubber or other suitable material and is fixed to the shaft 13 for rotation therewith. Mounted for rotation on the shaft 14 and a limited amount of translation is a unitary assembly 20 comprising a channel-shaped driver 21, a clutch collar 23 having a plurality of shoulders 25, 27, and 29 thereon, and a time wheel 31 having a clutch facing 33 affixed thereto. The elements 15, 19 and 21 form a time clutch 35, which when engaged drives the unitary assembly 20.

The means for engaging and disengaging the clutch 35 includes a solenoid 37 attached to a lever 39 which is pivotally mounted to the housing 17 by a pin 41. The upper portion of the lever 39 includes a pair of upwardly extending arms 43, the upper internal portion of each arm being provided with a roller or pin 47 which will allow the clutch collar 23 to rotate thereon. The pins 47 are positioned between the shoulders 25 and 27 of the clutch collar 23 so as to be capable of transmitting horizontal movement to the unitary assembly 20 along the shaft 14, but still allow the unitary assembly to rotate on the shaft. Thus, when the solenoid 37 is energized, it will move the lever 39 so as to engage the driver 21 and the clutch facing 19 of the clutch 35. A fixed collar 49 which is secured to the shaft 14 by a screw 50 limits movement of the unitary assembly 20 to the left along the shaft 14.

It is usually desired to rotate the time wheel 31 from an initial position to a final position. The initial position is established by the engagement of a stop 51 which is fixed to the housing 17 and a projection 53 on the time wheel 31. A torsion spring 55 which is fixed to the housing 17 at one end and to the shoulder 29 of the unitary assembly 20 at the other end normally urges the projection 53 into engagement with the stop 51. Accordingly, the clutch 35 may be engaged to rotate the time wheel 31 from the initial position to a final postiion, and when the final position is reached and the clutch 35 is disengaged, the torsion spring 55 will return the time wheel 31 to the initial position.

A second unitary assembly 57 is provided and includes time set wheel 59 having two U-shaped clutch elements 61 attached thereto as by screws 62, and a clutch collar 63 secured to the time set wheel and having shoulders 65, 67, and 68 thereon. The second unitary assembly 57 is mounted for axial and rotational movement on the shaft 14 and its axial movement is limited by a collar 69 which is secured to the shaft 14 by a screw 70. The two U-shaped clutch elements 61 and the clutch facing 33 together make up a time set clutch 71 and may be engaged by means similar to those provided for engaging the time clutch 35. The clutch-engaging means includes a solenoid 73 connected to a lever 75 which is pivotally mounted on a pin 77. The upper portion of the lever 75 has two upwardly extending arms 79 which partially surround the clutch collar 63 between the shoulders 65 and 67. The inside surface of each of the arms 79 is provided with a pin or roller 81 which extends between the shoulders 65 and 67. Thus, by energizing the solenoid 73, the lever 75 is caused to pivot about the pin 77 and move the second unitary assembly so that the time set clutch 71 becomes engaged. Accordingly, rotation of the time wheel 31 may be selectively transmitted to the time set wheel 59.

The time set wheel 59 is usually rotated from an initial position, which is defined by the engagement of a projection 83 on the wheel 59 with a stop 85 secured to the housing 17, to a final position. A torsion spring 87 is wound on the clutch collar 63 and is connected at one end to the clutch collar 63 and at the other end to the housing 17 and normally biases the time set wheel 59 to the initial position.

It is usually desired to lock the time set wheel 59 in the final position and, accordingly, a dog clutch 89 (FIGS. 3 and 4) is provided. The dog clutch 89 includes a mounting bracket 91 suitably secured by screws 93 (FIG. 4) to a portion 95 of the housing 17. A shaft 97 having a collar 99 rigidly secured to one end thereof by a screw 100 is rotatably mounted in the bracket 91. A resilient arm 101 carries a lock unit at its free end for engaging the rim of the wheel 59 and is rigidly attached at the other end to a face of the collar 99 and sandwiched between the collar 99 and a flange 103 of the bracket 91. The lock unit includes a vinyl sleeve 100' on a pin 102 fixed in a U bracket 104 formed at the end of the arm 101. With the dog clutch engaged (FIG. 3), the sleeve of the lock unit frictionally engages the time set wheel 59. The frictional engagement is insufficient to hold the time set wheel when it is being driven by the motor 11 via clutch 35 and clutch 71, but is sufficient to prevent the wheel 59 from being returned to the initial position under the force of the torsion spring 87 after the time set clutch 71 has been disengaged. Thus, when engaged, the resilient lock allows the time set wheel 59 to be driven by the motor 11, but does not permit its return under the bias of the torsion spring 87. With the dog clutch disengaged (FIG. 2) the end of the resilient lock does not engage the edge of the time set wheel 59 and, accordingly, the time set wheel may be returned to the initial position under the bias of the torsion spring 87.

To disengage the dog clutch, a dog clutch solenoid 107 supported by a plate 108 and having a rod 109 is pivotally connected to a link 111, which is rigidly secured to the shaft 97 by a pin 113. Thus, actuation of the solenoid 107 moves the arm 109 which transmits this motion through the link 111, the shaft 97, and the collar 99 to the resilient lock unit to disengage the lock from the time set wheel 59.

In normal operation of the device, the second unitary assembly 57 may move axially a slight distance. It is required, however, that the dog clutch through its resilient lock remain in engagement with the time set wheel 59 when this wheel is experiencing slight axial movement. To allow the dog clutch to remain engaged during this axial movement, the resilient lock is preferably constructed of a single strip of resilient metal. With this construction and with the resilient lock unit in frictional engagement with the time set wheel 59, the resilient lock remains in engagement with the time set wheel by flexing laterally as shown in FIG. 4 in response to axial movement of the time set wheel. Thus, the dog clutch of this invention efficiently compensates for slight axial movement of the time set wheel 59.

Switching means are provided on the time wheel 31 and the time set wheel 59 for a purpose which will be subsequently described. A normally open microswitch 115 (FIG. 2) having a roller 117 projecting therefrom is suitably secured to a plate 119 which is rigidly mounted on the time set wheel 59. A switch actuator 121 which is a substantially L-shaped member is mounted on the time wheel 31 and extends toward the time set wheel 59. Thus, rotation of the time wheel 31 relative to the time set wheel 59 will eventually bring the switch actuator 121 into engagement with the roller 117 of the microswitch 115 to actuate same.

To automatically operate the device shown in FIGS. 1 through 4, the circuitry of FIG. 5 is provided. The motor 11 is connected to a source of 115-volt, 60-cycle alternating current through a switch 123 and runs continuously during operation of the instrument. Means are provided to energize the solenoils 37 and 73. A positive 18-volt D.C. source is connected through a Count-Off-Reset switch 125 and a conventional pulse-forming network 127 to provide an input in the form of a start pulse to a conventional bistable circuit 129. The switch 125 may be manually set to the Off and Count positions and is spring biased to return to the Off position when manually moved to the Reset position and released. The output of the bistable circuit 129 on a line 133 drives the coil of a relay 145 through a two-stage amplifier gate circuit employing transistors 131, 135, with the relay energized when the bistable circuit is in the On condition. Diode 148 may be connected across the coil of the relay 145. When the relay 145 is energized a contact set 146 connects solenoids 37 and 73 to a power source through dropping resistors 147, 149, respectively. Diodes 148, 151 and 153 serve to suppress reverse voltage developed when the relay 145 is de-energized.

One terminal of the solenoid 73 is connected to a source of +18 volts direct current through the normally open microswitch 115 and a Standard-Ratio switch 155. When the switch 155 is in the Standard position and the microswitch 115 is closed and the relay 145 is energized, the solenoid 73 will be energized to engage the time set clutch 71.

The timer of the invention is described herein in a typical use with a nuclear counter, but it should be noted that the timer may be used for interval timing and control in many applications and with various means for setting the initial time interval.

As illustrated herein, a pulse source 157, typically a scintillation tube or a Geiger counter tube, produces a pulse train which is connected as an input to a pulse counter 161 through a gate 159. The gate 159 is controlled by the output of the bistable circuit 129 via a line 161a, with the gate open or conducting when the bistable circuit is in the On condition and the gate closed or non-conducting when the bistable circuit is in the Off condition. The counter 161 produces a stop pulse on a line 162 for switching the bistable circuit to the Off condition after counting a predetermined number of pulses or events. The predetermined number may be set by a switch 164 and preferably is some multiple of 10.

When the counter 161 has counted the predetermined number of events, it feeds a stop pulse to the bistable circuit 129 through the Standard-Ratio switch 155 and a pulse shaping network 166 comprising resistors 163, 165, 167, a capacitor 169, and a diode 171. The stop pulse causes the bistable circuit 129 to change state resulting in a negative voltage being applied to the base circuit of the transistor 131 and de-energization of the relay 145 and the solenoids 37 and 73.

As set out above, the solenoid 107 functions to disengage the dog clutch 89 from the time set wheel 59. A timer reset switch 173 is manually closed to connect the solenoid 107 to a source of power through a dropping resistor 175 and the Standard-Ratio switch 155 when in the Standard position. The dog clutch 89 cannot be released when the switch 155 is in the Ratio position.

When the Standard-Ratio switch 155 is in the Ratio position, i.e., the opposite of the position shown in FIG. 5, closing of the microswitch 115 will supply a positive 18 volts D.C. to the network 166 producing a positive stop pulse input to the bistable circuit 129 which results in de-energization of the relay 145 and the solenoid 37.

The operation of this device as used to determine the ratio of the number of events occurring in an unknown sample and the number of events occurring in a standard will be described. Before the test is begun the switches are in the positions indicated in FIG. 5. The projection 53 of wheel 31 is engaging the stop 51 and the projection 83 of the wheel 59 is engaging the stop 85. The switch 123 is first closed to start the motor 11. A standard sample of radioactive material is placed adjacent the radioactive sensitive pulse source 157. Both the time wheel 31 and the time set wheel 59 are in their initial positions; that is, the time wheel 31 has its projection 53 urged into engagement with the stop 51 by the spring 55, and the time set wheel 59 has its projection 83 urged into engagement with the stop 85 by the torsion spring 87. The time reset push button 173 is depressed to make certain the clutch 89 is released. The switch 125 is turned to the Reset position to zero the counter 161. A desired count is set for the counter by switch 164.

When the operator desires to begin counting the predetermined number of events, he turns the Count-Off-Reset switch 125 to the Count position. A start pulse is generated for the input of the bistable circuit 129 causing it to change state to the On condition and energizing the relay 145 and close the contact set 146 to apply −18 volts D.C. to the solenoids 37 and 73. Energized solenoid 37 will pivot the lever 39 to force the driver 21 into engagement with the clutch facing 19 to thereby engage the time clutch 35. This causes the time wheel 31 to begin rotating with the motor output shaft. The change in state of the bistable circuit also shifts the gate 159 to the open condition connecting the pulse source to the counter. The time wheel 31 begins rotating from its initial position, i.e., begins measuring time, at the same time that the counter 161 begins counting.

As the time wheel 31 continues to rotate, the switch actuator 121, which is secured thereto, will eventually contact the roller 117 on the microswitch 115 to close same. This action operates to apply positive 18 volts D.C. to one terminal of the solenoid 73 through the Standard-Ratio switch 155 to energize the solenoid 73, which in turn pivots the lever 75 to cause the U-shaped clutch element 61 to firmly contact the clutch facing 33 to engage the time set clutch 71. At this instant, the time set wheel 59 begins rotating. It should be noted that the switch actuator 121 may actuate the microswitch 115 at any time after the time wheel 31 has begun to rotate so long as the actuation occurs prior to the instant at which the time wheel 31 reaches its final position. That is, the actuation of the microswitch 115 may occur at any position intermediate the initial and final positions of the time wheel 31. The minimum time for which the standard count can be conducted is limited by the time required to initially engage the switch 115 and actuator 121.

The time wheel 31 and the time set wheel 59 continue to turn together and, therefore, the actuator 121 remains in engagement with the roller 117 to thereby keep the microswitch 115 closed. During this time, the resilient lock of the dog clutch 89 is in engagement with the edge of the time set wheel 59 as shown in FIG. 3. When the counter 161 has counted the predetermined number of events or input pulses, it feeds a positive stop pulse to the bistable circuit through the Standard-Ratio switch 155 and the network 166. The time wheel 31 and the time set wheel 59 are then in the final position. This pulse causes the bistable circuit 129 to change to the Off state, de-energize the relay 145 and solenoids 37 and 73, and switch gate 159 to closed. When the solenoid 37 is de-energized, the lever 39 is pivoted so as to move the driver 21 away from the clutch facing 19 to thereby disengage the time clutch 35. When this occurs, the torsion spring 55 immediately rotates the time wheel 31 back to the initial position where the projection 53 engages the stop 51. Likewise, the de-energization of the solenoid 73 pivots the lever 75 so as to disengage the U-shaped clutch element 61 from the clutch facing 33 to thereby disengage the time set clutch 71. The time set wheel 59 is now independent of the time wheel 31; however, it does not return to its initial position under the urging of torsion spring 87 because of the frictional engagement of the end 105 of the resilient lock on its edge. Accordingly, the time wheel 31 is rotated by the torsion spring 55 to the initial position, and the time set wheel 59 is locked by the resilient lock in the final position. This moves the actuator 121 with respect to the microswitch 115 to cause the microswitch to open. As the time set wheel 59 remains in the final position, it retains the period of time which has been measured by the rotation of the time wheel 31.

The Count-Off-Reset switch 125 is turned to the Reset position to reset the counter and then returns to the Off position. The standard sample of radioactive material is replaced by an unknown sample. The Standard-Ratio switch 155 is turned from the Standard position shown in FIG. 5 to the Ratio position. Next the Count-Off-Reset switch 125 is turned to the Count position and the bistable circuit changes to the On state, the counter 161 begins counting, and the time clutch 35 is engaged in the manner described above. The microswitch 115 is no longer in circuit with the time set clutch solenoid 73 and this solenoid is not affected by the relay 145. The time wheel 31 rotates until the switch actuator 121 contacts the roller 117 of the microswitch 115 to close it. At this instant the wheel 31 has again reached the final position, and, as the motor 11 turns at constant speed, the wheel 31 has turned for exactly the same amount of time that it turned while the nuclear disintegrations from the standard sample were being counted. When the microswitch 115 is closed, a +18 volts D.C. is applied to the network 166. This results in a positive stop pulse being applied to the bistable circuit 129 which changes to the Off state and de-energizes the relay 145 and the solenoid 37 and closes the gate 159 to the counter 161 to stop the counter. The number of events counted are then read directly on the counter 161. By applying the appropriate decimal point, the ratio S is read directly on the counter.

Thus it can be seen that the counter 161 automatically counts the pulses from the unknown sample for the same period of time that it counted pulses from the standard. Also the counter 161 was automatically turned off when the time wheel 31 reached the final position during the counting of the unknown sample. Of course, by repeating the procedure given above, ratios for any number of samples may be determined for the same standard.

Whenever it is desired to employ a different standard sample for comparative purposes, the Standard-Ratio switch 155 must be put in the Standard position shown in FIG. 5 and the timer reset switch 173 must be closed. This energizes the dog clutch solenoid 107 to rotate the link 111 to remove the resilient lock from frictional engagement with the edge of the time set wheel 59. The torsion spring 87 will then turn the time set wheel 59 to its initial position and a new period of time from a new standard sample may be set into the device in the manner described above.

It should be understood that the various values of voltage stated herein are given by way of illustration only and not by way of limitation. Also, in its broader aspects, the invention requires relative movement between two members to measure and retain a given time period and relative rotation between two wheels is not necessarily required.

Although exemplary embodiments of the invention have been disclosed and discussed, it will be understood that other applications of the invention are possible and that the embodiments disclosed may be subjected to various changes, modifications, and substitutions without necessarily departing from the spirit of the invention.

What is claimed is:
1. A timing device with automatic interval setting comprising:
counting means for counting a predetermined number of events;
means for measuring the period of time required for counting said predetermined number of events;
retaining means for retaining said period of time; and
means responsive to said retaining means for counting events for an interval of time equal to said period of time.
2. A timing device with automatic interval setting comprising:
counting means for counting a predetermined number of events;
means for measuring the period of time required for counting said predetermined number of events including a movable member, means for displacing said member at a constant rate throughout said period of time, and means responsive to said counting means for halting displacement of said member when said predetermined number of events has been counted;
retaining means adjusted by the displacement of said member for retaining said period of time; and
means responsive to said retaining means for controlling said counting means to count events for an interval of time equal to said period of time.
3. A timing device with automatic interval setting comprising:
counting means for counting a predetermined number of events;
a rotatably mounted member;
means operative simultaneously with the energization of said counting means for rotating said member;
means responsive to said counting means having completed counting said predetermined number of events for halting the rotation of said member, the amount of rotation of said member corresponding to a period of time;
retaining means adjusted by the rotation of said member for retaining said period of time; and
means responsive to said retaining means for counting a second number of events for an interval of time equal to said period of time.
4. A timing device with automatic interval setting comprising:
counting means for counting a predetermined number of events;
a rotatably mounted time wheel;
means for simultaneously energizing said counting means to begin counting said predetermined number of events and for initiating rotation of said time wheel from an initial position toward a final position;
means responsive to said counting means having completed counting said predetermined number of events for halting said rotation of said time wheel at said final position, the rotation of said time wheel from said initial to said final position corresponding to a period of time;
means for returning said time wheel to said initial position;
means for causing subsequent rotation of said time wheel from said initial to said final position; and
means for counting a second number of events during said subsequent rotation.
5. A timing device with automatic interval setting comprising:
counting means for counting a predetermined number of events;
a rotatably mounted time wheel;
means operative when said counting means begins counting said predetermined number of events for rotating said time wheel at a constant speed from an initial position toward a final position;
means responsive to said counting means having completed counting said predetermined number of events for halting said rotation of said time wheel at said final position, said rotation corresponding to a period of time;
a rotatably mounted time set wheel adjacent said time wheel;
means responsive to rotation of said time wheel to rotate said time set wheel with said time wheel to said final position;
means for stopping said time set wheel at said final position;
means for locking said time set wheel at the final position;
means for returning said time wheel to said initial position;
means for counting a second number of events;
means for simultaneously starting the last-mentioned means and for initiating subsequent rotation of said time wheel at said constant speed from said initial position toward said final position;

means on said time set wheel adjusted by the rotation of the time wheel for stopping said subsequent rotation of said time wheel at said final position to thereby allow said subsequent rotation for an interval of time equal to said period of time; and means for stopping said means for counting a second number of events simultaneously with the stopping of said subsequent rotation.

6. A timing device with automatic interval setting comprising:

counting means for counting a predetermined number of nuclear disintegrations from a standard sample of radioactive material;

means for measuring the period of time required for counting said predetermined number of nuclear disintegrations including a movable member, means for displacing said member at a constant rate throughout said period of time, and means responsive to said counting means for halting displacement of said member when said predetermined number of events has been counted;

retaining means adjusted by the displacement of said member for retaining said period of time; and means responsive to said retaining means for counting a second number of nuclear disintegrations from another sample of radioactive material for an interval of time equal to said period of time.

7. A timing device with automatic interval setting comprising:

counting means for counting a predetermined number of nuclear disintegrations from a standard sample of radioactive material;

means for measuring the period of time required for counting the predetermined number of nuclear disintegrations;

retaining means for retaining said period of time; and means responsive to said retaining means for counting a second number of nuclear disintegrations from another sample of radioactive material for an interval of time equal to said period of time.

8. A timing device with automatic interval setting comprising:

means for measuring an initial unknown period of time;

retaining means for retaining said initial period of time; and means responsive to said retaining means for activating an external device for a subsequent interval of time equal to said initial period of time.

9. A timing device with automatic interval setting comprising:

a motor;

a first member movable from an initial position to a final position;

clutch means for intermittently placing said motor in driving connection with said first member;

a second member movable from an intermediate position to said final position;

means for moving said second member from said intermediate position to said final position in response to movement of said first member;

means for simultaneously stopping said members at said final position;

means for locking said second member in said final position;

means for returning said first member to said initial position;

means for subsequently moving said first member from said initial position toward said final position; and means on said second member to halt said subsequent movement of said first member at said final position.

10. A timing device with automatic interval setting comprising:

a rotatable time wheel;

a motor for rotating said time wheel at constant speed;

a time clutch for intermittently placing said motor in driving connection with said time wheel;

a rotatably mounted time set wheel adjacent said time wheel; and a time set clutch for intermittently placing said time wheel in driving connection with said time set wheel.

11. A timing device with automatic interval setting comprising:

a rotatably mounted time wheel;

a motor for rotating said time wheel at constant speed;

a time clutch for intermittently placing said motor in driving connection with said time wheel;

a rotatably mounted time set wheel adjacent said time wheel;

a time set clutch for intermittently placing said time wheel in driving connection with said time set wheel;

a switch on said time set wheel; and a switch actuator on said time wheel for cooperating with said switch.

12. A timing device with automatic interval setting comprising:

a housing;

a motor on said housing;

a rotatable shaft supported by said housing and rotated by said motor;

a time wheel mounted on said shaft;

clutch means for intermittently connecting said time wheel for rotation with said shaft;

a time set wheel mounted on said shaft; and clutch means for intermittently connecting said time set wheel for rotation with said time wheel.

References Cited

UNITED STATES PATENTS

| | | | |
|---|---|---|---|
| 3,087,063 | 4/1963 | Gatzert | 250—106 |
| 3,257,561 | 6/1966 | Packard et al. | 250—106 |
| 3,265,897 | 8/1966 | Sinila et al. | 250—106 |
| 3,271,574 | 9/1966 | Dawson et al. | 250—106 |

ARCHIE R. BORCHELT, *Primary Examiner.*